No. 759,324. PATENTED MAY 10, 1904.
M. P. STEVENS.
HOSE COUPLING.
APPLICATION FILED MAY 18, 1903.
NO MODEL.
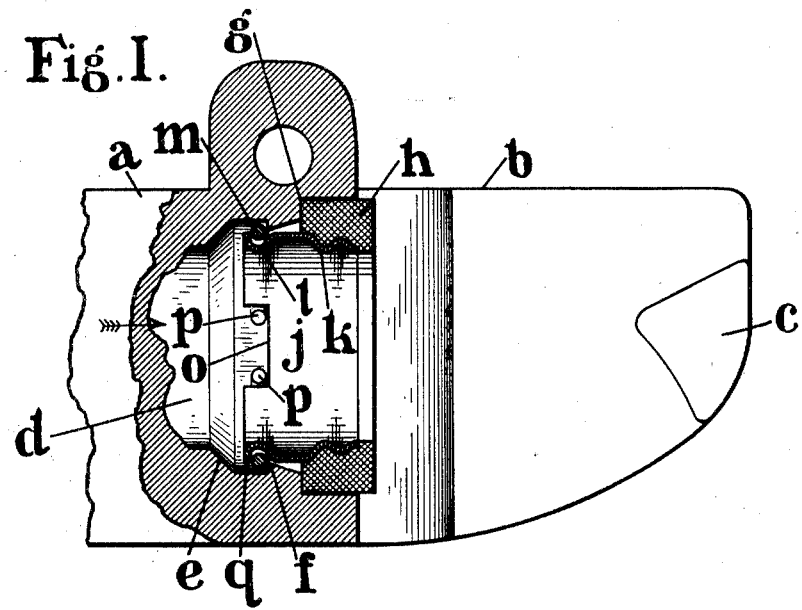
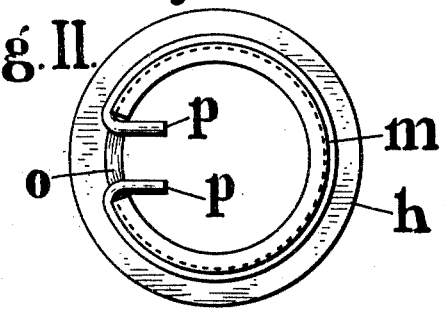
WITNESSES:
Lindsley Schepmoes
Conrad E. Thomp
Merton P. Stevens
INVENTOR
Kenneson Cross Curley Rubino
ATTORNEYS No. 759,324. Patented May 10, 1904.

UNITED STATES PATENT OFFICE.

MERTON P. STEVENS, OF EAST ORANGE, NEW JERSEY, ASSIGNOR TO SAFETY CAR HEATING & LIGHTING COMPANY, A CORPORATION OF NEW JERSEY.

HOSE-COUPLING.

SPECIFICATION forming part of Letters Patent No. 759,324, dated May 10, 1904.

Application filed May 18, 1903. Serial No. 157,557. (No model.)

*To all whom it may concern:*

Be it known that I, MERTON P. STEVENS, a citizen of the United States, residing at East Orange, Essex county, State of New Jersey, have invented certain new and useful Improvements in Hose-Couplings, of which the following is a specification.

My invention relates to hose-couplings, and has for its particular object to improve hose-couplings adapted for use in coupling steam-hose.

The improvement is mainly directed to the production of means whereby a gasket may be securely anchored in the coupling and may be readily removable therefrom, and, further, to improve the form of gasket.

In the drawings, Figure I represents a broken-away sectional view of one member of a hose-coupling embodying my invention; and Fig. II is a rear view of the gasket looking in the direction of the arrow in Fig. I.

In the drawings, $a$ represents a coupler-head provided with a side arm $b$, provided with a suitable engaging means $c$. The coupling, as shown, may be provided with a straight port $d$, having a circumferential recess $e$. Part of the wall of the recess $e$ is formed by a rib $f$, (shown in the present instance as constituting a continuous lug or shoulder.) The coupler-head is also recessed at $g$ to form a seat for the molded portion $h$ of the gasket or other bearing portion of the gasket. As shown in the drawings, the gasket consists of a molded portion $h$ and a metallic sleeve $j$. The metallic sleeve $j$ is preferably provided with corrugations or ribs $k$ or other anchoring means for retaining the molded portion $h$ of the gasket. The metallic portion $j$ is preferably grooved or shouldered at $l$ for the reception of the locking spring-ring $m$ and is herein shown, as notched at $o$ to receive the inturned ends or tongs $p$ of the locking-ring $m$. The locking-ring $m$ is adapted to be permanently retained upon the metallic ring $j$ and is adapted to be made slightly smaller by drawing the two ends or tangs $p$ of the locking-spring closer together, which may be done by means of pliers or otherwise.

In the drawings I have shown the gasket in place in the coupler-head, the spring-ring $m$ serving as a locking means intervening between the rear outturned edge $q$ of the ring $j$ and the shoulder or lug $f$.

When it is desired to remove the gasket from the coupler-head for the purpose of replacing same or for inspection or otherwise, it is merely necessary to draw the ends $p$ of the locking-ring closer together, and thereby collapse the said spring locking-ring sufficiently to enable the gasket to be pulled out of the coupler-head. This may be done by any suitable means—such, for instance, as inserting a loop of twine into the coupler-head over the two inturned ends $p$.

Having described my invention, what I claim, and desire to secure by Letters Patent, is—

1. In a coupling, the combination of a coupler-head shouldered internally, a gasket seated in the said coupler-head and comprising in its structure a metal retaining-ring recessed exteriorly to receive a peripheral locking-spring and a collapsible peripheral locking-spring surrounding the retaining-ring and intervening between the shouldered portion of the coupling and a portion of the metal retaining-ring.

2. The combination of a coupler-head provided with an internal shouldered portion, a gasket adapted to be seated in the coupler-head, a retaining-ring for the gasket, a locking-ring adapted to the retaining-ring and provided with inwardly-projecting tangs whereby the said ring may be collapsed sufficiently to permit the gasket to be removed from the coupling, the said ring, when in its expanded condition, intervening between the shouldered portion of the coupler-head and a portion of the retaining-ring.

3. In a coupler, the combination of a recessed coupler-head provided with an internal shoulder, a gasket adapted to be seated in the recess of the coupler-head and provided with a retaining device, said retaining device being externally grooved for the reception of a locking-ring, and a locking-ring seated in the groove of the retaining device and intervening between the wall of the groove and the shouldered portion of the coupler-head.

4. In a coupling, the combination of a recessed and shouldered coupler-head, a gasket, and means for supporting the gasket in the head comprising a shouldered retaining device for the gasket and a spring locking-ring intervening between the shoulder in the head and the retaining device and having two inwardly-projecting parts adapted to be drawn together to collapse the locking-ring and permit the gasket to be removed from the head.

5. In a coupling, the combination of a recessed and shouldered coupler-head, a gasket and means for supporting the gasket in the head comprising a shouldered retaining device for the gasket and a spring locking-ring intervening between the shoulder in the head and the retaining device and having two freely-movable bent ends both adapted for reciprocal movement to collapse the spring-ring.

6. In a coupling, the combination of a recessed and shouldered coupler-head, a gasket and its slotted retaining member, a spring-ring engaging said slotted retaining member, and having a plurality of operating portions $p\,p$, projecting into the slotted portion of the slotted retaining member.

7. In a coupling, the combination of a recessed and shouldered coupler-head, a gasket and in its grooved retaining-ring and a spring-ring seated in a groove of the retaining-ring and having two free ends $p\,p$.

8. In combination, a recessed coupler-head shouldered internally, a removable gasket provided with a shouldered retaining device, and a curved locking-spring intervening between the shouldered portions of the head and retaining device and having two tangs or ends for engagement by a tool to remove the gasket from the head.

9. In combination, a shouldered coupler-head, a shouldered gasket, and a locking-spring between the head and gasket and provided with two free ends or portions for engagement by a tool.

10. In combination, a shouldered head, a gasket, a peripherally grooved and slotted retaining device and a spring locking-ring seated in the groove and having two free ends projecting through the slot of the retaining device into the interior thereof.

MERTON P. STEVENS.

Witnesses:
FREDERICK E. KESSINGER,
ELMER E. ALLBEE.